United States Patent
Madsen et al.

(10) Patent No.: US 10,047,720 B2
(45) Date of Patent: Aug. 14, 2018

(54) WIND TURBINE BLADE COMPRISING VORTEX GENERATORS

(75) Inventors: Jesper Madsen, Gesten (DK); Ines Wurth, Ludwigsburg (DE); Rolf Hansen, Kolding (DK); Olaf Muller, Kolding (DK)

(73) Assignee: LM WINDPOWER A/S, Kolding (DK)

( * ) Notice: Subject to any disclaimer, the term of this patent is extended or adjusted under 35 U.S.C. 154(b) by 759 days.

(21) Appl. No.: 14/232,108

(22) PCT Filed: Jul. 20, 2012

(86) PCT No.: PCT/EP2012/064301
§ 371 (c)(1),
(2), (4) Date: Jan. 10, 2014

(87) PCT Pub. No.: WO2013/014082
PCT Pub. Date: Jan. 31, 2013

(65) Prior Publication Data
US 2014/0140856 A1    May 22, 2014

(30) Foreign Application Priority Data

Jul. 22, 2011  (EP) ..................................... 11175052
Feb. 21, 2012  (GB) .................................. 1202894.0

(51) Int. Cl.
*F03D 1/06*  (2006.01)
*F03D 7/02*  (2006.01)
(Continued)

(52) U.S. Cl.
CPC ........... *F03D 1/0641* (2013.01); *F03D 7/022* (2013.01); *F03D 7/0232* (2013.01); *B64C 23/06* (2013.01);
(Continued)

(58) Field of Classification Search
CPC ........ F03D 1/001; F03D 1/003; F03D 1/0641; F03D 7/022; F03D 7/0232;
(Continued)

(56) References Cited

U.S. PATENT DOCUMENTS 6,910,867 B2 *  6/2005  Corten .................. F03D 1/0641
                                                    416/223 R
2008/0175711 A1  7/2008  Godsk et al.
(Continued)

FOREIGN PATENT DOCUMENTS

EP    2 141 358 A1    1/2010
WO    00/15961 A1    3/2000
(Continued)

OTHER PUBLICATIONS

Janiszewska, J.M.,"Three Dimensional Aerodynamics of a Simple Wing in Oscillation Including Effects of Vortex Generators Dissertation", (online), The Ohio State University, 2004.
(Continued)

*Primary Examiner* — Igor Kershteyn
*Assistant Examiner* — Brian P Wolcott
(74) *Attorney, Agent, or Firm* — Nath, Goldberg & Meyer; Jerald L. Meyer; Annie J. Kock

(57) ABSTRACT

Disclosed is a wind turbine blade and a method for retrofitting a wind turbine blade, the wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, wherein the suction side of the wind turbine blade is provided with a plurality of vortex generators positioned along a mounting
(Continued)

line having a proximal end point nearest the root end and a distal end point nearest the tip end, wherein the mounting line is a concave line seen from the trailing edge of the wind turbine blade.

23 Claims, 6 Drawing Sheets

(51) Int. Cl.
*B64C 23/06* (2006.01)
*F03D 13/10* (2016.01)
*F03D 80/50* (2016.01)

(52) U.S. Cl.
CPC .............. *F03D 13/10* (2016.05); *F03D 80/50* (2016.05); *F05B 2240/122* (2013.01); *F05B 2250/11* (2013.01); *F05B 2250/13* (2013.01); *Y02E 10/721* (2013.01); *Y10T 29/49318* (2015.01)

(58) Field of Classification Search
CPC ............ F05B 2240/122; F05B 2250/11; F05B 2250/13; F05B 2260/222; B64C 23/06; Y10T 29/49318; Y02E 10/721
See application file for complete search history.

(56) References Cited

U.S. PATENT DOCUMENTS

| | | | |
|---|---|---|---|
| 2010/0008787 A1 | 1/2010 | Godsk | |
| 2010/0209258 A1* | 8/2010 | Fuglsang | F03D 1/0641 416/90 R |
| 2012/0151769 A1* | 6/2012 | Brake | F03D 1/0608 29/889.71 |

FOREIGN PATENT DOCUMENTS

| | | | |
|---|---|---|---|
| WO | 01/16482 A1 | 3/2001 | |
| WO | WO 0116482 A1 * | 3/2001 | ........... F03D 1/0633 |
| WO | 02/08600 A1 | 1/2002 | |
| WO | 2006/122547 A1 | 11/2006 | |
| WO | 2008/113349 A2 | 9/2008 | |
| WO | 2010/100237 A2 | 9/2010 | |

OTHER PUBLICATIONS

Godard, G., et al.,"Control of a decelerating boundary layer, Part 1: Optimization of passive vortex generatiors", Aerospace Science and Technology, vol. 10, pp. 181-191, (2006), XP28033030A.
Kim D. H., et al.,"Predicting Unsteady Blade Loads of a Wind Turbine Using RANS and Vorticity Transport Methodologies", European Wind Energy Conference, Apr. 20, 2010-Apr. 23, 2010, Warsaw, Poland, XP009152918.
Savino, J.M., et al., "Wind Turbine Flow Visualization Studies", Proceedings: Windpower '85, Aug. 27-30, 1985, San Francisco, CA, pp. 559-564, XP009152928.
"Vortex Generators"(online), http://www.bcchapel.org/pages/0003/Vortex%20Generator.html, published before Apr. 2011.

* cited by examiner

WIND TURBINE BLADE COMPRISING VORTEX GENERATORS

This is a National Phase Application filed under 35 U.S.C. 371 as a national stage of PCT/EP2012/064301, filed Jul. 20, 2012, claiming priority from European Application No. 11175052.7, filed Jul. 22, 2011, and Application from United Kingdom Application No. 1202894.0, filed Feb. 21, 2012, the content of each of which is hereby incorporated by reference in its entirety.

The present invention relates to a wind turbine blade comprising vortex generators, in particular a wind turbine blade comprising vortex generators arranged on the suction side surface of the wind turbine blade.

BACKGROUND

Wind turbine manufacturers are constantly making efforts to improve the efficiency of their wind turbines in order to maximise the annual energy production. Further, the wind turbine manufacturers are interested in prolonging the lifetime of their wind turbine models, since it takes a long time and a lot of resources to develop a new wind turbine model. An obvious way to improve the efficiency of the wind turbine, is to improve the efficiency of the wind turbine blades, so that the wind turbine can generate a higher power output at a given wind speed.

WO 01/16482 discloses a blade which is provided with vortex generators arranged in a U-shaped pattern along a line that is convex as seen from the from the trailing edge of the wind turbine blade.

WO 02/08600 discloses a blade which is provided with vortex generators arranged along a line that is parallel to the leading edge on the pressure side of the blade.

WO 2010/100237 discloses a blade which is provided with vortex generators arranged along a straight line.

Accordingly, there is a need for ways to improve the efficiency of new and/or existing blades.

SUMMARY

Accordingly, it is an object of the present invention to provide a wind turbine blade with improved aerodynamic properties enabling higher energy yield.

A wind turbine blade for a rotor of a wind turbine having a substantially horizontal rotor axis, the rotor comprising a hub from which the wind turbine blade extends substantially in a radial direction when mounted to the hub is provided, the wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, wherein the suction side of the wind turbine blade is provided with a plurality of vortex generators positioned along a mounting line having a proximal end point nearest the root end and a distal end point nearest the tip end. The mounting line is a concave line seen from the trailing edge of the wind turbine blade, wherein the proximal end point is located in a blade length interval of 0-0.12L from the root end and in a relative chordal position of 2%-20%, and wherein the distal end point is located in a blade length interval of 0.2L to 0.5L from the root end and in a relative chordal position of 25%-75%

Further, a method for retrofitting a wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift is provided, the method comprising mounting a plurality of vortex generators along a mounting line having a proximal end point nearest the root end and a distal end point nearest the tip end. The mounting line is a concave line seen from the trailing edge of the wind turbine blade, wherein the proximal end point is located in a blade length interval of 0-0.12L from the root end and in a relative chordal position of 2%-20%, and wherein the distal end point is located in a blade length interval of 0.2L to 0.5L from the root end and in a relative chordal position of 25%-75%. The method may comprise mounting vortex generators to provide a wind turbine as described herein.

The concave mounting line is preferably concave along the entire mounting line. With other words a line drawn between the two end points should not cross the mounting line.

The wind turbine blade according to the present invention provides improved flow on a wind turbine blade with improved aerodynamic properties thereby enabling a higher energy yield from the wind turbine with the respective wind turbine blade. In particular, a wind turbine blade with improved aerodynamic properties in the transition region and a first part of the airfoil region of the blade is provided.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
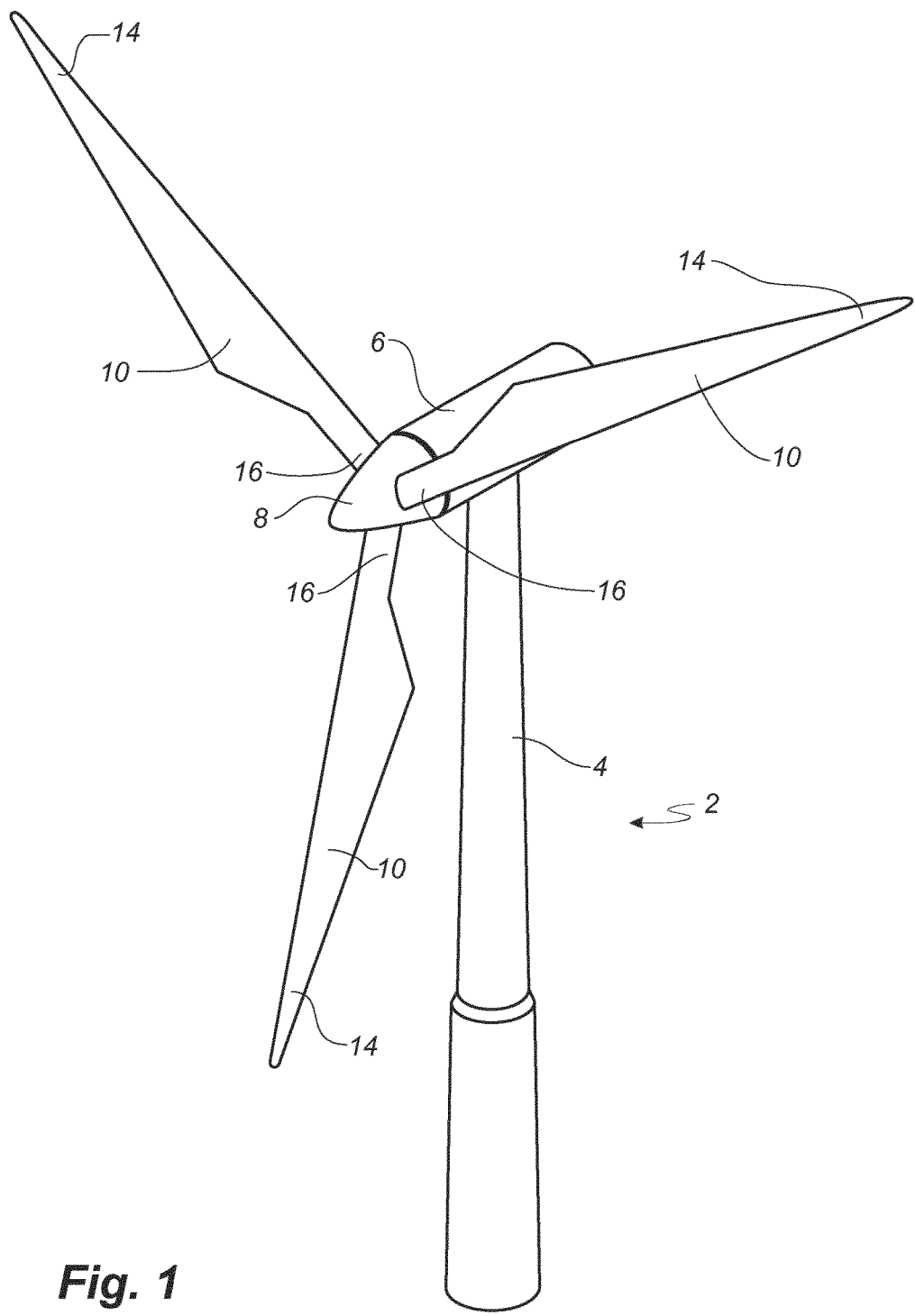
FIG. 1 shows a wind turbine.

The figures are schematic and simplified for clarity, and they merely show details which are essential to the understanding of the invention, while other details have been left out. Throughout, the same reference numerals are used for identical or corresponding parts.

The wind turbine blade according to the present invention allows for a vortex generator configuration, where the vortex generators are arranged close to the area of possible or expected flow separation on the suction side of a corresponding wind turbine blade without the vortex generators, the flow separation being caused by the inherent suboptimum aerodynamic profile of the root region and the transition region. Accordingly, the wind turbine blade provides an improved separation profile by moving the separation towards the trailing edge or even preventing separation on the suction side of the wind turbine blade. At the same time, the induced drag from the vortex generators protruding from the suction side surface is minimized, since they are moved as close as possible to the trailing edge of the blade.

The chord-wise distance between the vortex generators and the expected separation line for a wind turbine blade without vortex generators cannot be too small, since the position of the separation line changes during different operating conditions. On the other hand, the chord-wise distance from the expected separation line cannot be too large, since the effect of the vortex generators is reduced with increased distance. It is desired that the vortex generators are positioned between the expected separation line and the leading edge in order to obtain the optimum effect. Further, it may be desired to arrange the vortex generators as far from the leading edge or as close to the trailing edge as possible in order to reduce or eliminate drag effects. The vortex generators are typically arranged between the expected separation line and the leading edge of the wind turbine blade.

It is recognised that the surface of the wind turbine blade itself curves. Therefore, a concave mounting line is to be understood as a line, which when projected into a chordal plane of the blade is concave, or equivalently that the mounting line may be concave from the trailing edge in a top view of the suction side of the blade. It is also understood that the plurality of vortex generators comprises a proximal vortex generator located at the proximal end point and a distal vortex generator located at the distal end point as well as at least one and preferably a plurality of intermediate vortex generator between the proximal vortex generator and the distal vortex generator. Intermediate vortex generator(s) may be located at intermediate point(s) on the mounting line. In an embodiment, line segments of the mounting line, i.e. a part of the mounting line may be concave.

A vortex generator may comprise a base with a centre position and one or a pair of vanes including a first vane and optionally a second vane protruding from the base. Centre positions of vortex generators may define end points and intermediate points of the mounting line.

The plurality of vortex generators may comprise one or more sets of vortex generators, e.g. a first set of vortex generators positioned along a first line segment of the mounting line and/or a second set of vortex generators positioned along a second line segment of the mounting line. The plurality of vortex generators or set(s) of vortex generators, such as a first set of vortex generators positioned along a first line segment and/or a second set of vortex generators positioned along a second line segment, may comprise at least 10, at least 20, at least 30, at least 40 or at least 50 vortex generators.

The mounting line may follow the centre position of the vortex generators or alternatively the leading edge of the vortex generators. The mounting line or line segment(s) thereof may follow or substantially coincide with a line defining the shortest path between two points, e.g. between two intermediate points or between an end point and an intermediate point of the mounting line, along the suction side surface of the wind turbine blade.

The mounting line may extend along a part of the blade length. The mounting line may extend along 10% to 50% of the blade length, such as along 15% to 40%. In one or more embodiments, the mounting line extends along 20% to 35% of the blade length.

The mounting line may form a smooth concave curve. However, in practice it can be cumbersome to arrange the vortex generators along a smooth concave curve, in particular since the vortex generators are often mounted on or via strips. Therefore, according to a particular advantageous embodiment, the concave mounting line is divided into two or more straight line segments.

The profiled contour of the wind turbine blade may be divided into a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region. The profiled contour may have a shoulder with a shoulder width and located at the boundary between the transition region and the airfoil region. The shoulder may be located in an interval of 0.15L to 0.25L, or 0.18L to 0.25L, or 0.19L to 0.24L from the root end, where L is the length of the wind turbine blade. The mounting line may extend along substantially the entire transition region of the blade.

The proximal end point of the mounting line is located close to the root end, e.g. in a blade length interval of 0-0.12L from the root end. In one or more embodiments, the proximal end point is located in a blade length interval of 0-0.10L, such as 0-0.08L or 0-0.06L from the root end.

The proximal end point is located at a chord-wise distance from the leading edge. The proximal end point is located in a relative chordal position of 2%-20% from the leading edge. In one or more embodiments, the proximal end point is located in a relative chordal position of 3%-15%, or 5-15%, e.g. approx 10% from the leading edge.

The distal end point may be located in the transition region or in the airfoil region. The distal end point of the mounting line is located in a blade length interval of 0.2L to 0.5L from the root end. In one or more embodiments, the distal end point is located in a blade length interval of 0.25L to 0.45L, such as from 0.3L to 0.4L, from the root end.

The distal end point is located at a chord-wise distance from the leading edge. The distal end point of the mounting line may be located in a relative chordal position of 25%-75% from the leading edge. In one or more embodiments, the distal end point is located in a relative chordal position of 30-60%, e.g. approx 50% from the leading edge.

A tangent to the proximal end point of the mounting line may form an angle with the pitch axis, e.g. in the range from 0 to 10 degrees, or from 0 to 5 degrees.

A tangent to the distal end point of the mounting line may form an angle with the pitch axis in the range from 5 degrees to 45 degrees, or 5 degrees to 35 degrees, or 5 degrees to 25 degrees, or 5 degrees to 15 degrees, such as 8 degrees.

The difference in tangent angles and/or chord-wise distance from the leading edge, provides a wind turbine blade showing improved aerodynamic properties, in particular near or at the shoulder and transition region.

The mounting line may comprise at least one intermediate point including a first intermediate point, wherein the at least one intermediate point divides the mounting line into a plurality of line segments including a first line segment and a second line segment. The first line segment may be straight and/or the second line segment may be straight. A straight line segment may be defined as a straight line in the chordal plane or equivalently that the line segment is straight in a top view of the suction side of the blade. Further, a straight line segment may be defined as the path defining the shortest distance between two points along the outer surface of the wind turbine blade.

A straight first line segment may form a first angle with the pitch axis in the range from 0 to 10 degrees, such as from 0 to 5 degrees.

A straight second line segment may form a second angle with the pitch axis in the range from 2 degrees to 60 degrees or from 5 to 45 degrees. In one or more embodiments, the second angle may be from 5 to 10 degrees, e.g. about 8 degrees.

The first intermediate point may be located in a blade length interval of 0.05L to 0.30L from the root end. In one or more embodiments, the first intermediate point is located in a blade length interval of 0.08L to 0.20L, such as 0.10L to 0.17L, from the root end. The first intermediate point may be located between the root end and the shoulder.

The first intermediate point may be located in a relative chordal position of 2%-20% from the leading edge. In one or more embodiments, the first intermediate point is located in a relative chordal position of 3%-15%, or 5-15%, e.g. approx 10% from the leading edge.

The mounting line may comprise a second intermediate point The second intermediate point may be located in a blade length interval of 0.10L to 0.4L from the root end, In one or more embodiments, the second intermediate point is located in a blade length interval of 0.15L to 0.3L, from the root end. The second intermediate point may be located between the shoulder and the tip end.

The second intermediate point may be located in a relative chordal position of 5%-30% from the leading edge. In one or more embodiments, the first intermediate point is located in a relative chordal position of 15-25%, e.g. approx 20% from the leading edge.

A straight third line segment, e.g. between the second intermediate point and the distal end point may form a third angle with the pitch axis in the range from 2 degrees to 60 degrees or from 5 to 45 degrees. In one or more embodiments, the third angle may be from 5 to 15 degrees, e.g. about 12 degrees. Line segments of the mounting line form angles with the pitch axis. The angles may increase with the distance from the root end. For example a second line segment closer to the tip end than a first line segment may form a second angle with the pitch axis larger than the first angle between the first line segment and the pitch axis. Additionally or as an alternative, a third line segment closer to the tip end than a second line segment may form a third angle with the pitch axis larger than the second angle between the second line segment and the pitch axis.

In general, vortex generators along the mounting line may be aligned with the leading edges of the vortex generators substantially parallel to mounting line tangents at the respective vortex generator positions. However, one or more vortex generators may be rotated about the centre position in order to provide a desired attack angle for the vane(s) of the respective vortex generator. For example, the leading edge of a vortex generator on a second or third line segment may be parallel to the pitch axis or form an angle with the pitch axis less than 3 degrees.

For example, a second set of vortex generators positioned along a second line segment of the mounting line may be arranged such that the first vanes thereof form respective first attack angles (angle between pitch axis and vane line at base) in the range from 65 degrees to 80 degrees or from 70 degrees to 75 degrees. Additionally or as an alternative, a distal vortex generator located at the distal end point may comprise a first vane forming a first attack angle with the pitch axis in the range from 65 degrees to 80 degrees or from 70 degrees to 75 degrees.

The vortex generators may be provided as an arrangement of vortex generators comprising an array of pairs of vortex generators.

Accordingly, there is provided an arrangement of vortex generators (VGs) for use on an airfoil profile, preferably on a wind turbine blade, said airfoil profile having a leading edge and a trailing edge, said VGs provided as an array of pairs of VGs, said VGs comprising substantially triangular VG vanes projecting from a surface of said airfoil profile, each of said pairs comprising a first VG and a second VG, wherein said VGs comprise:

a first end provided towards said leading edge;
a second end provided towards said trailing edge;
a base extending between said first end and said second end adjacent the surface of the airfoil; and
a tip provided at the distal end of said triangular VG vane, wherein said VGs are skewed relative to the flow direction of the airfoil, and wherein
l is the length of the base of the VGs;
s is the distance between the respective second ends of first and second VGs in a VG pair;
h is the height from said surface of said tip of a VG in a VG pair;
z is the distance between nominal centre lines defined between the first and second VGs of adjacent VG pairs in the array; and
β is the angle of skew of the VGs relative to the flow direction of the airfoil, characterized in that:
l/h is between 1-5, preferably approximately 2;
s/h is between 4-15, preferably between 6-10, most preferably approximately 7;
z/h is between 7-20, preferably between 8-15, most preferably approximately 10; and
β is between 6-16 degrees, preferably between 9-13 degrees, most preferably approximately 12 degrees.

By arranging the vortex generators according to these ranges, there was a surprising improvement in airfoil performance when compared to the prior art. While variation of individual values and ratios was found to increase the drag generated by the vortex generators with respect to the prior art, a surprising effect was found for these ranges, wherein the proposed vortex generator arrangement acted to reduce the drag and increased the lift when compared with the prior art system.

Preferably, said VGs comprise right angle triangle VG vanes, wherein the hypotenuse of said vanes extends from the base at said first end to the distal tip at said second end.

Preferably, the VGs of said VG pairs are angled with regard to the flow direction over the airfoil. Preferably, the VGs of said VG pairs provided in a convergent arrangement at the first end of a VG pair.

Preferably, the first ends of the adjacent VGs form a narrow, relatively convergent end of the VG pair, and that the second ends of the adjacent VGs form a wider, divergent end of the VG pair.

Preferably, angle β is measured from the respective first ends towards the second ends.

In comparison to the state of the art described in Godard [G. Godard & M. Stanislas; *Control of a decelerating boundary layer. Part 1: Optimization of passive vortex generators; Aerospace Science and Technology* 10 (2006) 181-191], while having an l/h ratio of between 4-15, by increasing the ratio of s/h to between 4-15, increasing the ratio of z/h to between 7-20, and reducing β to between 6-16 degrees, a surprising improvement in aerodynamic performance was discovered, resulting in an improved configuration of vortex generator pairs on an airfoil.

While individually any one of the above described adjustments to the vortex generator arrangement would result in an increase in drag and a negative impact on aerodynamic performance, the combination of these feature adjustments presents an improvement over the prior art, which is not thought or suggested in the state of the art.

There is further provided a wind turbine blade having an arrangement of vortex generators as described above, and a wind turbine having at least one such wind turbine blade.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three wind turbine blades 10 extending radially from the hub 8, each wind turbine blade having a blade root or root end 16 nearest the hub and a blade tip or tip end 14 furthest from the hub 8.

Figure 2:
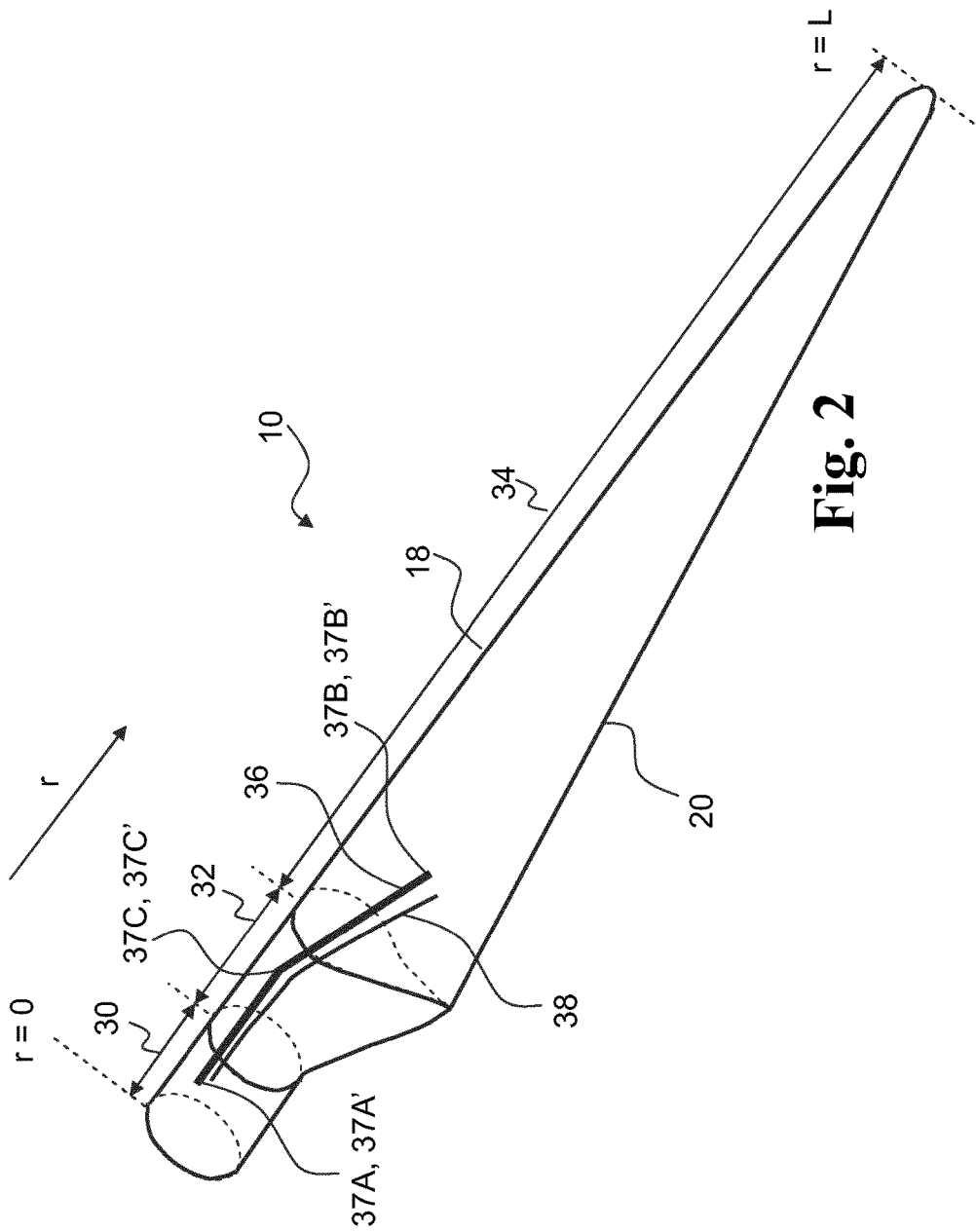
FIG. 2 shows a schematic view of a wind turbine blade with vortex generators according to the invention.

FIG. 2 shows a schematic view of a wind turbine blade 10 according to the present invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub. The shape of the blade in the root region and the transition region is not optimum with regard to aerodynamics, however necessary due to structural considerations. It should be noted that the chords of different sections of the blade normally do not lie in a common plane, since the blade may be twisted and/or curved (i.e. pre-bent), thus providing the chord or chordal plane with a correspondingly twisted and/or curved course, this being most often the case in order to compensate for the local velocity of the blade being dependent on the radius from the hub.

The suction side of the wind turbine blade is provided with a plurality of vortex generators positioned along a mounting line 36 having a proximal end point 37A with a proximal vortex generator 37A' nearest the root end and a distal end point 37B with a distal vortex generator 37B' nearest the tip end. The mounting line 36 is a concave line seen from the trailing edge 20 of the wind turbine blade. The vortex generators are mounted between an expected separation line 38 and the leading edge 18 of the wind turbine blade. A first intermediate point 37C with a first intermediate vortex generator 37C' divides the mounting line 36 into a straight first line segment extending from the proximal end point 37A to the first intermediate point 37C and a straight second line segment extending from the first intermediate point 37C to the distal end point 37B.

Figure 3:
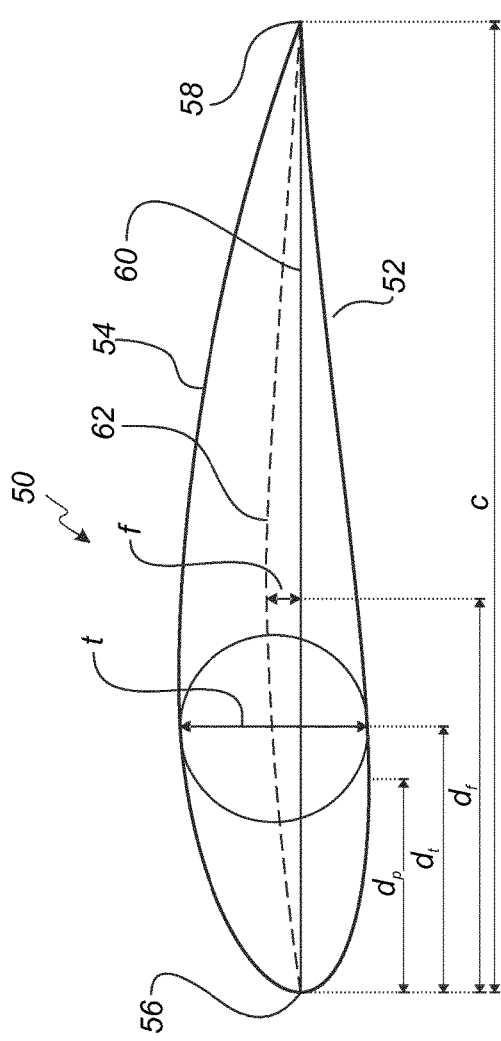
FIG. 3 shows a schematic view of an airfoil profile.
Figure 4:
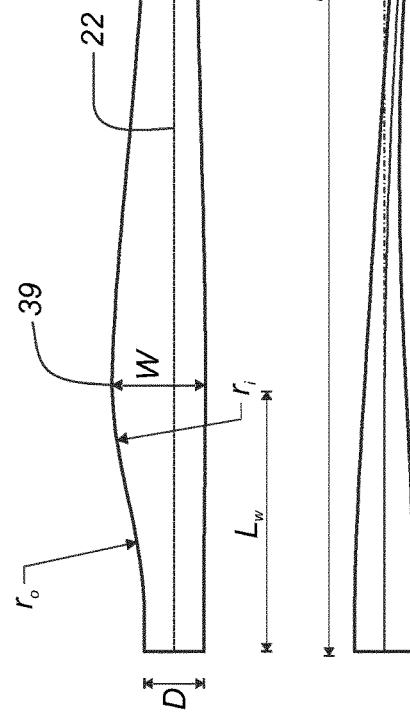
FIG. 4 shows a schematic view of a wind turbine blade seen from above and from the side.

FIGS. 3 and 4 depict parameters, which may be used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the wind turbine blade. The wind turbine blade has a total blade length L. As shown in FIG. 3, the root end is located at position r=0, and the tip end located at r=L. A shoulder 39 of the blade 10 is defined as the position, where the blade 10 has its largest chord length. The shoulder 39 is typically provided at the boundary between the transition region 32 and the airfoil region 34. The shoulder 39 of the blade is located at a position r=$L_w$, and has a shoulder width W, which equals the chord length at the shoulder 39. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade may be provided with a prebend, which is defined as Δy, which corresponds to the out of plane deflection from a pitch axis 22 parallel to the longitudinal direction of the blade.

Figure 5:
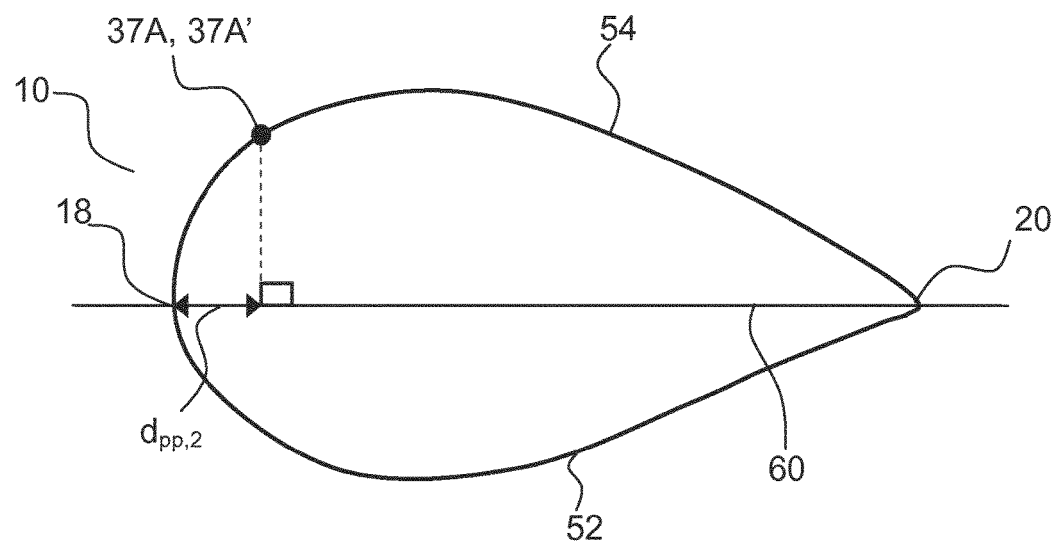
FIG. 5 illustrates an exemplary cross section of a wind turbine blade at the proximal end point, FIG. 6 schematically illustrates vortex generators mounted on the suction side of a wind turbine blade.

FIG. 5 shows a cross section of a wind turbine blade perpendicular to the longitudinal direction at the distance $d_{pp,1}$ of the proximal end point 37A from the root end. The centre position of the proximal vortex generator 37A' defines the proximal end point 37A. The proximal end point 37A is located at a chord-wise distance $d_{pp,2}$ from the leading edge. The distance $d_{pp,2}$ may be in the range from 0.02c to 0.2c, e.g. about 0.10c as illustrated, where c is the length of the chord at distance $d_{pp,1}$ from the root end.

Figure 6:
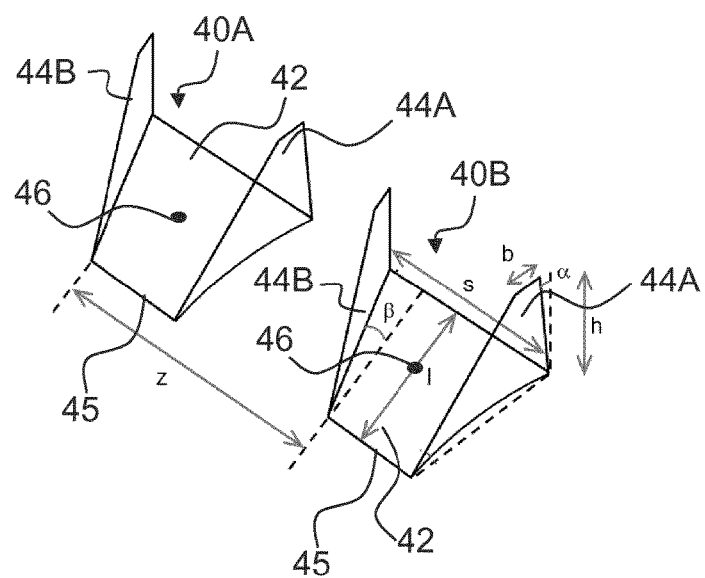

FIG. 6 shows exemplary vortex generators 40A, 40B mounted on the suction side surface of a wind turbine blade. The vortex generators 40A, 40B each comprise a base 42 with a first vane 44A and second vane 44B extending from the base 42. The base 42 has a leading edge 45 and a centre position 46 which may coincide with or partly define the mounting line 36. The leading edge 45 may in general be parallel to the mounting line and/or the leading edge 45 may be substantially parallel to the pitch axis.

Parameter values of exemplary vortex generators VG1, VG2 and VG3 and their configuration on the suction side of the wind turbine blade are shown in Table 1.

TABLE 1

Vortex generator parameters

| Parameter | Ref | Unit | VG1 | VG2 | VG3 |
|---|---|---|---|---|---|
| Height | h | [mm] | 10 (5-15) | 20 (15-25) | 30 (25-35) |
| Length (width) | l | [mm] | 20 (10-30) | 40 (30-50) | 60 (50-70) |
| Length (vane top) | b | [mm] | 2.4 (1-4) | 4.8 (3-6) | 7.5 (6-9) |
| Spacing | s | [mm] | 30 (20-40) | 60 (40-80) | 90 (70-110) |
|  | z | [mm] | 50 (30-70) | 100 (75-125) | 150 (100-200) |
| Angle | a | [deg] |  | 6 (3-9) |  |
|  | β | [deg] |  | 18 (10-25) |  |
|  | α | [deg] |  | 0.9 (0.5-1.5) |  |

In Table 1, spacing parameter values z are indicated for neighboring vortex generators of the same type (VG1, VG2, VG3). When shifting from VG1 to VG2 in a panel or between neighbouring vortex generators, the distance z between VG1 and VG2 may be in the range from 50 mm to 100 m, e.g. 75 mm. When shifting from VG2 to VG3 in a panel or between neighbouring vortex generators, the distance z between VG2 and VG3 may be in the range from 100 mm to 150 m, e.g. 125 mm. Neighboring vortex generators may be rotated about their centre position in relation to each other in order to facilitate optimum attack angle and wind flow across the vortex generator. The base 42 may be planar, single-curved or double-curved in order to facilitate mounting on the suction side of the wind turbine blade.

Figure 7:
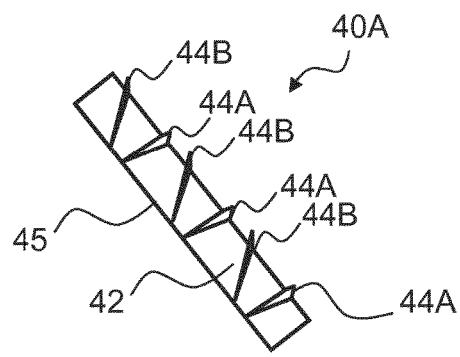
FIG. 7 is a perspective view of a vortex generator.

FIG. 7 is a perspective view of a vortex generator comprising a plurality of vane sets mounted on a base 42, each vane set comprising a first vane 44A and a second vane 44B. A compensation angle may be added or subtracted from the vane angle β of the different vanes in Table 1 in order to adapt the vortex panel for installation at different angles with respect to the pitch axis, thereby accommodating for the prevailing direction of the inflow.

Figure 8:
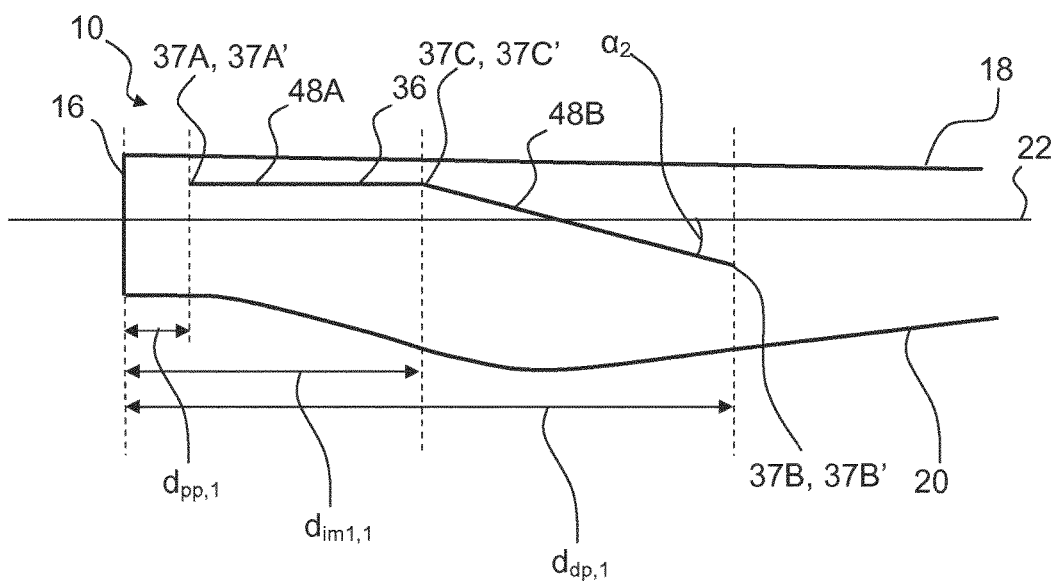
FIG. 8 illustrates a part of an exemplary wind turbine blade according to the invention.

FIG. 8 illustrates a part of an exemplary wind turbine blade according to the invention. The wind turbine blade comprises a plurality of vortex generators mounted or arranged along a mounting line 36. The proximal end point 37A of the mounting line 36 is located close to the root end at a distance $d_{pp,1}=0.04L$ from the root end. The proximal end point 37A is located at a chord-wise distance $d_{pp,2}=0.11c$ from the leading edge. A tangent to the proximal end point 37A is substantially parallel to the pitch axis corresponding to an angle of 0 degrees with the pitch axis. The distal end point 37B of the mounting line 36 is located in the airfoil region at a distance $d_{dp,1}=0.35L$ from the root end and at a chord-wise distance $d_{dp,2}=0.5c$ from the leading edge. A tangent to the distal end point of the mounting line forms an angle with the pitch axis of about 8 degrees. The mounting line 36 comprises a first intermediate point 37C located at a distance $d_{im1,1}=0.13L$ from the root end and at a chord-wise distance $d_{im1,2}=0.10c$ from the leading edge. The first intermediate point 37C divides the mounting line into a straight first line segment 48A parallel to the pitch axis 22 and a straight second line segment 48B forming a second angle $\alpha_2$ of about 8 degrees with the pitch axis 22. A first set of vortex generators comprising at least 10 vortex generators, such as about 35 vortex generators, is positioned along the first line segment. A second set of vortex generators comprising at least 10 vortex generators is positioned along the second line segment.

The chord-wise distance from the leading edge may increase for vortex generators on the mounting line towards the tip end. For example for a first intermediate vortex generator and a second intermediate vortex generator on the mounting line, $d_{im1,2}>d_{im2,2}$ where $d_{im1,1}<d_{im2,1}$.

Figure 9:
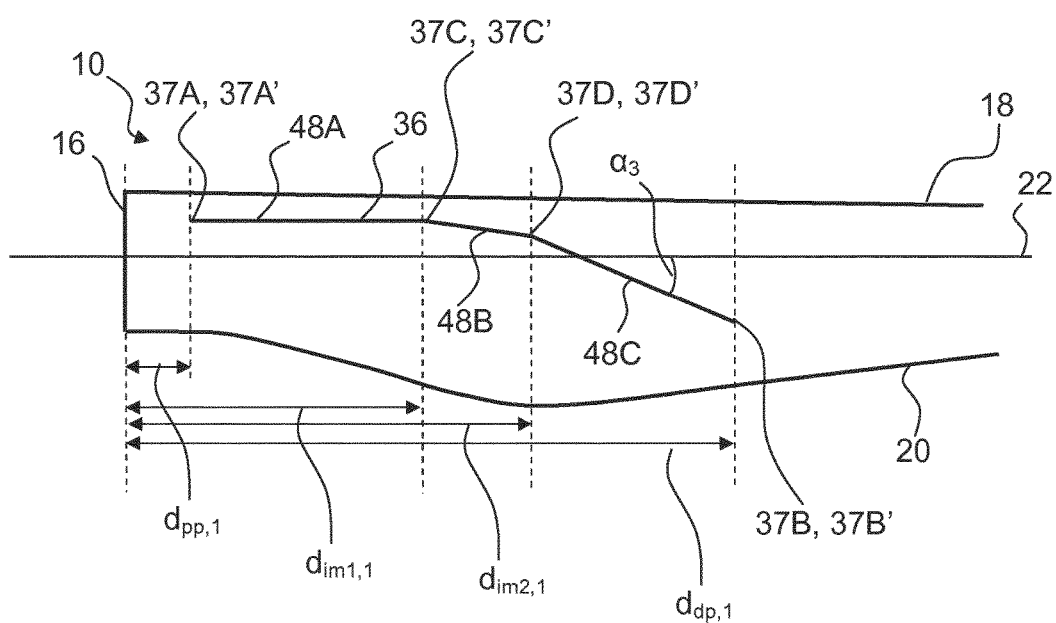
FIG. 9 illustrates a part of an exemplary wind turbine blade according to the invention.

FIG. 9 illustrates a part of an exemplary wind turbine blade according to the invention where the mounting line 36 further comprises a second intermediate point 37D with a second intermediate vortex generator 37D' at the shoulder between the first intermediate point 37C and the distal end point 37B in FIG. 8 and a third line segment 48C with a third angle $\alpha_3$ of about 12 degrees with the pitch axis 22. The second line segment 48B between the first intermediate point 37C and the second intermediate point 37D forms a second angle $\alpha_2$ of about 4 degrees with the pitch axis 22. The distance $d_{im2,1}$ is 0.21L and $d_{im2,2}$ is 0.2c.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCES 2 wind turbine
4 tower
6 nacelle
8 hub
10 blade
14 blade tip/tip end
16 blade root/root end
18 leading edge
20 trailing edge
22 pitch axis 30 root region
32 transition region
34 airfoil region
36 mounting line
37A proximal end point
37A' proximal vortex generator
37B distal end point
37B' distal vortex generator
37C first intermediate point
37C' first intermediate vortex generator
37D second intermediate point
37D' second intermediate vortex generator
38 separation line
39 shoulder
40A, 40B vortex generator
42 base
44A first vane
44B second vane
45 leading edge
46 centre position
48A first line segment
48B second line segment
48C third line segment
50 airfoil profile
52 pressure side
54 suction side
56 leading edge
58 trailing edge
60 chord
62 camber line/median line
c chord length
$d_{pp,1}$ distance of proximal end point from root end
$d_{pp,2}$ chord-wise distance of proximal end point from leading edge
$d_{dp,1}$ distance of distal end point from root end
$d_{dp,2}$ chord-wise distance of distal end point from leading edge
$d_{im1,1}$ distance of first intermediate point from root end
$d_{im1,2}$ chord-wise distance of first intermediate point from leading edge
$d_{im2,1}$ distance of second intermediate point from root end
$d_{im2,2}$ chord-wise distance of second intermediate point from leading edge
$\alpha_1$ first angle between first line segment and pitch axis
$\alpha_2$ second angle between second line segment and pitch axis
$\alpha_3$ third angle between third line segment and pitch axis
$d_t$ position of maximum thickness
$d_f$ position of maximum camber
$d_p$ position of maximum pressure side camber
f camber
L blade length
r local radius, radial distance from blade root
t thickness
$v_w$ wind speed
$\Delta y$ prebend

The invention claimed is:

1. A wind turbine blade (10) for a rotor of a wind turbine (2) having a substantially horizontal rotor axis, the rotor comprising a hub (8) from which the wind turbine blade extends substantially in a radial direction when mounted to the hub (8), the wind turbine blade extending in a longitudinal direction (r) along a pitch axis and having a tip end (14) and a root end (16) as well as a blade length, the wind turbine blade further comprising a profiled contour including a pressure side and a suction side, as well as a leading edge (18) and a trailing edge (20) with a chord having a chord length extending there between, the profiled contour, when being impacted by an incident airflow generating a lift, wherein the suction side of the wind turbine blade is provided with a plurality of vortex generators positioned along a mounting line (36) having a proximal end point (37A) nearest the root end and a distal end point (37B) nearest the tip end, characterized in that the mounting line is a concave line over an entire length of the mounting line seen from the trailing edge of the wind turbine blade, wherein the proximal end point is located between the leading edge (18) and a pitch axis (22) of the wind turbine blade (10) in a blade length interval of 0-0.12L from the root end and in a relative chordal position of 2%-20%, and wherein the distal end point is located in a blade length interval of 0.2L to 0.5L from the root end and in a relative chordal position of 25%-75%, wherein a first line segment of the mounting line is longitudinally positioned in a straight line between the pitch axis and the leading edge,
 wherein the plurality of vortex generators is arranged along two or more straight lines; and
 wherein the mounting line is not at any point closer to the trailing edge than a straight line drawn between the proximal end point and the distal end point.

2. The wind turbine blade according to claim 1, wherein the mounting line extends along 10% to 50% of the blade length.

3. The wind turbine blade according to claim 1, wherein the proximal end point is located in a blade length interval of 0-0.10L, or 0-0.08L, or 0-0.06L from the root end.

4. The wind turbine blade according to claim 1, wherein the proximal end point is located in a relative chordal position of 2%-20%, or 3%-15%, or 5-15% from the leading edge.

5. The wind turbine blade according to claim 1, wherein the distal end point is located in a blade length interval of 0.25L to 0.45L, or 0.3L to 0.4L from the root end.

6. The wind turbine blade according to claim 1, wherein the distal end point is located in a relative chordal position of 25%-70% or 30-60% from the leading edge.

7. The wind turbine blade according to claim 1, wherein a tangent to the proximal end point of the mounting line forms an angle with the pitch axis in the range from 0 to 10 degrees, or 0 to 5 degrees.

8. The wind turbine blade according to claim 1, wherein a tangent to the distal end point of the mounting line forms an angle with the pitch axis in the range from 5 degrees to 45 degrees, or 5 degrees to 35 degrees, or 5 degrees to 25 degrees, or 5 degrees to 15 degrees.

9. The wind turbine blade according to claim 1, wherein the mounting line comprises at least a first intermediate point dividing the mounting line into the straight first line segment and a second line segment.

10. The wind turbine blade according to claim 9, wherein the first intermediate point is located in a blade length interval of 0.05L to 0.30L, or 0.08L to 0.20L, or 0.10L to 0.17L from the root end.

11. The wind turbine blade according to claim 9, wherein the first intermediate point is located in a relative chordal position of 2%-20% from the leading edge.

12. The wind turbine blade according to claim 9, wherein the first line segment forms a first angle with the pitch axis in the range from 0 to 10 degrees.

13. The wind turbine blade according to claim 9, wherein the second line segment is straight and forms a second angle with the pitch axis in the range from 2 degrees to 60 degrees or 5 to 45 degrees.

14. The wind turbine blade according to claim 1, wherein the profiled contour is divided into:

a root region (30) having a substantially circular or elliptical profile closest to the hub, an airfoil region (34) having a lift-generating profile furthest away from the hub, and a transition region (32) between the root region (30) and the airfoil region (34), the transition region (32) having a profile gradually changing in the radial direction from the circular or elliptical profile of the root region to the lift-generating profile of the airfoil region wherein the mounting line extends along substantially the entire transition region of the blade.

15. The wind turbine blade according to claim 14, the profiled contour having a shoulder (39) with a shoulder width and located at the boundary between the transition region (32) and the airfoil region (34), wherein the shoulder is located in an interval of 0.15L to 0.25L, or 0.18L to 0.25L, or 0.19L to 0.24L from the root end.

16. The wind turbine blade according to claim 1, wherein a distal vortex generator is located at the distal end point, the distal vortex generator comprising a base and a pair of vanes including a first vane and a second vane protruding from the base, wherein the first vane forms a first attack angle with the pitch axis in the range from 65 degrees to 80 degrees or from 70 degrees to 75 degrees.

17. A method for retrofitting a wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, the method comprising mounting a plurality of vortex generators along a mounting line having a proximal end point nearest the root end and a distal end point nearest the tip end, characterized in that the mounting line is a concave line over an entire length of the mounting line seen from the trailing edge of the wind turbine blade, wherein the proximal end point is located between the leading edge (18) and a pitch axis (22) of the wind turbine blade (10) in a blade length interval of 0-0.12L from the root end and in a relative chordal position of 2%-20%, and wherein the distal end point is located in a blade length interval of 0.2L to 0.5L from the root end and in a relative chordal position of 25%-75%, wherein a first line segment of the mounting line is longitudinally positioned in a straight line between the pitch axis and the leading edge, wherein the plurality of vortex generators is arranged along two or more straight lines; and wherein the mounting line is not at any point closer to the trailing edge than a straight line drawn between the proximal end point and the distal end point.

18. The wind turbine blade according to claim 4, wherein the relative chordal position is 10% from the leading edge.

19. The wind turbine blade according to claim 6, wherein the relative chordal position is 50% from the leading edge.

20. The wind turbine blade according to claim 8, wherein the angle is 8 degrees.

21. The wind turbine blade according to claim 11, wherein the relative chordal position is 10% from the leading edge.

22. A wind turbine blade (10) for a rotor of a wind turbine (2) having a substantially horizontal rotor axis, the rotor comprising a hub (8) from which the wind turbine blade extends substantially in a radial direction when mounted to the hub (8), the wind turbine blade extending in a longitudinal direction (r) along a pitch axis and having a tip end (14) and a root end (16) as well as a blade length, the wind turbine blade further comprising a profiled contour including a pressure side and a suction side, as well as a leading edge (18) and a trailing edge (20) with a chord having a chord length extending there between, the profiled contour, when being impacted by an incident airflow generating a lift, wherein the suction side of the wind turbine blade is provided with a plurality of vortex generators positioned along a mounting line (36) having a proximal end point (37A) nearest the root end and a distal end point (37B) nearest the tip end, characterized in that the mounting line is a concave line over an entire length of the mounting line seen from the trailing edge of the wind turbine blade, wherein the proximal end point is located between the leading edge (18) and a pitch axis (22) of the wind turbine blade (10) in a blade length interval of 0-0.12L from the root end and in a relative chordal position of 2%-20%, and wherein the distal end point is located in a blade length interval of 0.2L to 0.5L from the root end and in a relative chordal position of 25%-75%, wherein the plurality of vortex generators is arranged along two or more straight lines;

wherein the mounting line is not at any point closer to the trailing edge than a straight line drawn between the proximal end point and the distal end point; and wherein the mounting line comprises at least a first intermediate point dividing the mounting line into a straight first line segment and a second line segment and a second intermediate point dividing the mounting line into the second line segment and a third line segment.

23. A method for retrofitting a wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, the method comprising mounting a plurality of vortex generators along a mounting line having a proximal end point nearest the root end and a distal end point nearest the tip end, characterized in that the mounting line is a concave line over an entire length of the mounting line seen from the trailing edge of the wind turbine blade, wherein the proximal end point is located between the leading edge (18) and a pitch axis (22) of the wind turbine blade (10) in a blade length interval of 0-0.12L from the root end and in a relative chordal position of 2%-20%, and wherein the distal end point is located in a blade length interval of 0.2L to 0.5L from the root end and in a relative chordal position of 25%-75%, wherein the plurality of vortex generators is arranged along two or more straight lines;

wherein the mounting line is not at any point closer to the trailing edge than a straight line drawn between the proximal end point and the distal end point; and wherein the mounting line comprises at least a first intermediate point dividing the mounting line into a straight first line segment and a second line segment and a second intermediate point dividing the mounting line into the second line segment and a third line segment.

* * * * *